July 8, 1952  D. L. MILLER  2,602,335

ENGINE STARTER GEARING

Filed March 23, 1951

WITNESS:
Esther M. Stockton

INVENTOR.
Donald L. Miller
BY
Clinton L. Janes
ATTORNEY

Patented July 8, 1952

2,602,335

UNITED STATES PATENT OFFICE 2,602,335

ENGINE STARTER GEARING

Donald L. Miller, Horseheads, N. Y., assignor to Bendix Aviation Corporation, a corporation of Delaware Application March 23, 1951, Serial No. 217,275

5 Claims. (Cl. 74—7)

1

The present invention relates to engine starter gearing, and more particularly to an automatically engaging and disengaging drive incorporating a combined overrunning and overload slipping clutch.

It is an object of the present invention to provide a novel starter gear of this type which is a compact self-contained unit of small size relative to its torque transmitting capacity.

It is another object to provide such a device which is efficient and reliable in operation while being simple and economical in construction.

Further objects and advantages will be apparent from the following description taken in connection with the accompanying drawing in which Fig. 1 is a side elevation partly broken away and in section of a preferred embodiment of the invention showing the parts in idle position.

Figure 1:
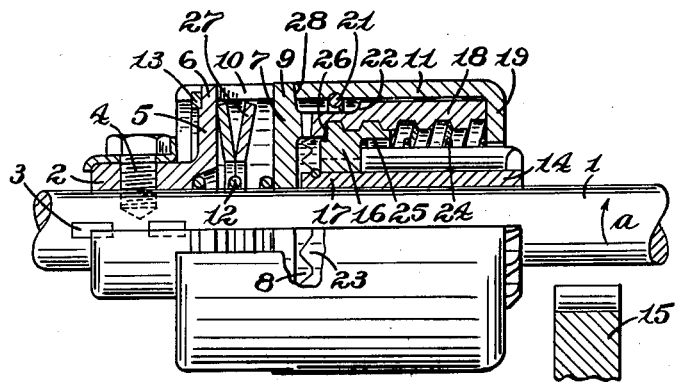

In Fig. 1 of the drawing there is illustrated a power shaft 1 on which a transmission member 2 is fixedly mounted as by means of keys 3 and set screw 4. The transmission member is provided with a radial flange 5 having a plurality of lugs 6 extending from the periphery thereof.

A driving clutch disc 7 is slidably mounted on the power shaft 1 and is provided with teeth 8 having inclined surfaces and with a plurality of lugs 9 extending radially from the clutch member. A barrel member 11 is mounted on the transmission member and driving clutch disc, and has a plurality of slots 10 slidably receiving the lugs 6 and 9 of said members. A light compression mesh-enforcing spring 12 is located between the transmission and driving clutch members urging them apart, and a lock ring 13 in the interior of the barrel 11 limits the separation of said members.

A pinion 14 is slidably journalled on the power shaft for longitudinal movement into and out of mesh with an engine gear 15. A screw shaft 16 is rigidly mounted in any suitable manner on the extended hub 17 of pinion 14, and a nut 18 threaded on the screw shaft 16 is slidably journalled within the barrel 11, being retained therein by a terminal flange 19 of said barrel. Movement of the nut 18 away from the flange 19 is limited by a lock ring 21 in the interior of the barrel engaging a shoulder 22 on said nut.

Nut 18 is provided with teeth 23 having in-

2 clined surfaces corresponding to the teeth 8 of the driving clutch member 7, these teeth being normally held in light engagement by the spring 12. An anti-drift spring 24 surrounds the pinion 14, bearing at one end against the barrel flange 19 and at its other end seating in a counterbore 25 in the nut, so as to urge the screw shaft 16 to the left in Fig. 1, its travel being limited by a shoulder 26 formed in the nut 18 at the ends of the threads therein. A heavy compression spring 27, preferably formed, as illustrated, by a plurality of spring discs, is located between the transmission member 5 and driving clutch disc 7, said heavy spring being arranged to be engaged by the driving clutch disc after a predetermined amount of compression of the light spring 12; after which the heavy spring 27 supplements the action of the light spring in strongly resisting further approach of the clutch disc toward the transmission member.

In operation, starting with the parts in the positions illustrated in Fig. 1, rotation of the power shaft 1 in the direction of the arrow $a$ by the starting motor, not illustrated, is transmitted through the transmission member 5 to barrel 11, to the driving clutch member 7 and through the teeth 8, 23 to the nut 18. The pinion 14 and screw shaft 16 are thereby traversed to the right until the pinion meshes with the engine gear 15, whereupon its movement is arrested by engagement of the screw shaft 16 with the barrel flange 19. The nut 18 and driving clutch member 7 are then moved backward by the screw-jack action of the nut and screw shaft, compressing the light spring 12 until the driving clutch member engages the heavy spring 27, after which further backward movement thereof is strongly resisted so that torque is built up to cause the pinion 14 to rotate the engine gear 15.

Figure 2:
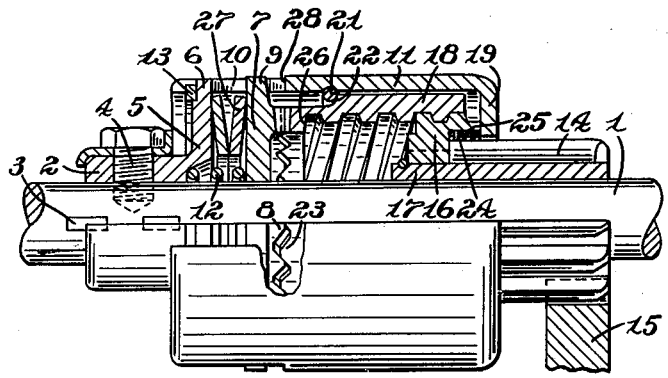
Fig. 2 is a similar view showing the parts in cranking position.

The torque so transmitted is limited by means of the stop ring 21 which arrests the backward movement of the nut 18. Thereafter increasing torque causes the clutch teeth 8, 23 to wedge apart as illustrated in Fig. 2, and if the predetermined torque is exceeded, the clutch teeth will slip over each other by further compression of the spring 27, thus protecting the drive from excessive torque.

When the engine starts, the acceleration of the pinion 14 by the engine gear causes it to thread itself back to its normal position with the assistance of the anti-drift spring 24, thereby permitting the driving clutch member 7 to be returned by spring 12 to its normal position, where the lugs 9 seat against the ends 28 of slots 10. Since at this time the clutch teeth 8, 23 are held together only by the pressure of spring 12, the teeth 23 of the nut may overrun the teeth 8 of the clutch member so as to dissipate the momentum of the pinion and nut without causing any tendency to rebound toward the engine gear.

Figure 3:
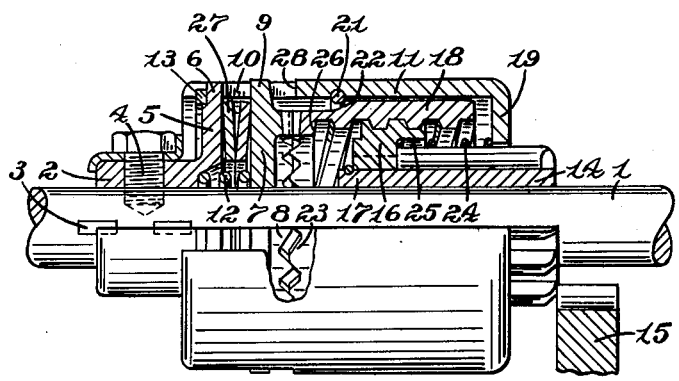
Fig. 3 is a similar view showing the parts in the positions assumed in case of tooth abutment between the pinion and engine gear.

In case during the meshing movement a pinion tooth should abut against a tooth of the engine gear as shown in Fig. 3, the movement of the pinion is arrested and the backward movement of the nut 18 compresses first the mesh-enforcing spring 12, and thereafter the heavy cushion spring 27. When sufficient torque has been built up to index the pinion teeth into proper registry with the tooth spaces of the engine gear, the spring 12 expands and snaps the pinion into initial engagement with the engine gear, after which meshing and cranking take place as shown.

Although but one embodiment of the invention has been shown and described in detail, it will be understood other embodiments are possible, and changes may be made in the design and arrangement of the parts without departing from the spirit of the invention.

I claim:

1. In an engine starter drive a power shaft, a transmission member fixed thereon having a radial flange, a driving clutch disc slidably mounted on the shaft, a barrel member surrounding the flange and disc having means for preventing relative rotation of the flange and disc, and limiting separation thereof, a light compression spring on the shaft between the flange and disc, a pinion slidably journaled on the shaft for movement into and out of mesh with an engine gear, a screw shaft fixed on the pinion, a nut threaded on the screw shaft slidably journaled in the barrel, means for limiting the longitudinal movement of the nut in the barrel; said driving clutch disc and said nut having interengaging inclined clutch teeth; and a heavy compression clutch spring in the barrel supplementing the action of the light spring in resisting the approach of the clutch disc to said flange.

2. An engine starter drive as set forth in claim 1 in which the barrel is provided with means limiting the axial movement of the screw shaft so as to define the meshing position of the pinion, and the means for limiting the longitudinal movement of the nut in the barrel is arranged to arrest its movement approximately at the point where such movement begins to compress the heavy clutch spring.

3. An engine starter drive as set forth in claim 1 in which the nut has an abutment limiting telescoping movement of the screw shaft therein, and including further a spring in the barrel urging the screw shaft toward idle position.

4. In an engine starter drive a power shaft, a transmission member fixed thereon, a driving clutch member slidably mounted on the shaft, a light compression spring between said members, a shorter stiff compression spring strongly resisting the approach of said members to each other, a pinion slidably journaled on the power shaft, a screw shaft fixedly mounted on the pinion, a driven clutch-nut member threaded on the screw shaft, said clutch members having interengaging inclined clutch teeth, a barrel member enclosing the clutch members and screw shaft, having a splined connection with the transmission and driving clutch members and means cooperating therewith for limiting their separation, said barrel also having means for limiting longitudinal movement of the driven clutch member therein to an amount substantially equal to the difference in length of the two springs.

5. A starter drive as set forth in claim 4 including further yielding means normally holding the pinion telescoped within the barrel, said barrel having an abutment engaged by the screw shaft to define the meshing position of the pinion.

DONALD L. MILLER.

No references cited.